United States Patent
Buckley et al.

(10) Patent No.: US 10,394,610 B2
(45) Date of Patent: Aug. 27, 2019

(54) MANAGING SPLIT PACKAGES IN A MODULE SYSTEM

(71) Applicant: Oracle International Corporation, Redwood Shores, CA (US)

(72) Inventors: Alexander R. Buckley, Cupertino, CA (US); Lai Hung Mandy Chung, Saratoga, CA (US); Mark B. Reinhold, Menlo Park, CA (US); Alan Bateman, Dublin (IE)

(73) Assignee: Oracle International Corporation, Redmond Shores, CA (US)

( * ) Notice: Subject to any disclaimer, the term of this patent is extended or adjusted under 35 U.S.C. 154(b) by 0 days.

(21) Appl. No.: 15/721,837

(22) Filed: Sep. 30, 2017

(65) Prior Publication Data

US 2019/0102230 A1  Apr. 4, 2019

(51) Int. Cl.
*G06F 9/44* (2018.01)
*G06F 9/50* (2006.01)
*G06F 9/54* (2006.01)
*G06F 9/30* (2018.01)

(52) U.S. Cl.
CPC ........ *G06F 9/5055* (2013.01); *G06F 9/30036* (2013.01); *G06F 9/5077* (2013.01); *G06F 9/542* (2013.01)

(58) Field of Classification Search
CPC .................................................. G06F 9/5055
See application file for complete search history.

(56) References Cited

U.S. PATENT DOCUMENTS

| | | | | |
|---|---|---|---|---|
| 2010/0088496 | A1* | 4/2010 | Zolnowsky ....... | G06F 17/30115 712/245 |
| 2012/0174058 | A1* | 7/2012 | Winkler ............ | G06F 8/34 717/105 |
| 2012/0284704 | A1* | 11/2012 | Friedman .......... | G06F 8/61 717/177 |
| 2014/0040328 | A1* | 2/2014 | Offer ................ | G06F 17/3007 707/821 |

* cited by examiner

*Primary Examiner* — Hang Pan
(74) *Attorney, Agent, or Firm* — Invoke

(57) ABSTRACT

Techniques for managing split packages in a module system are disclosed. A code conflict exists between two packages, in different modules, based at least in part on the packages being named identically and including executable code. No code conflict exists between two other identically-named packages, in different modules, based at least in part on the packages not including any executable code. Managing split packages may be based, at least in part, on module membership records associated with the modules.

20 Claims, 10 Drawing Sheets

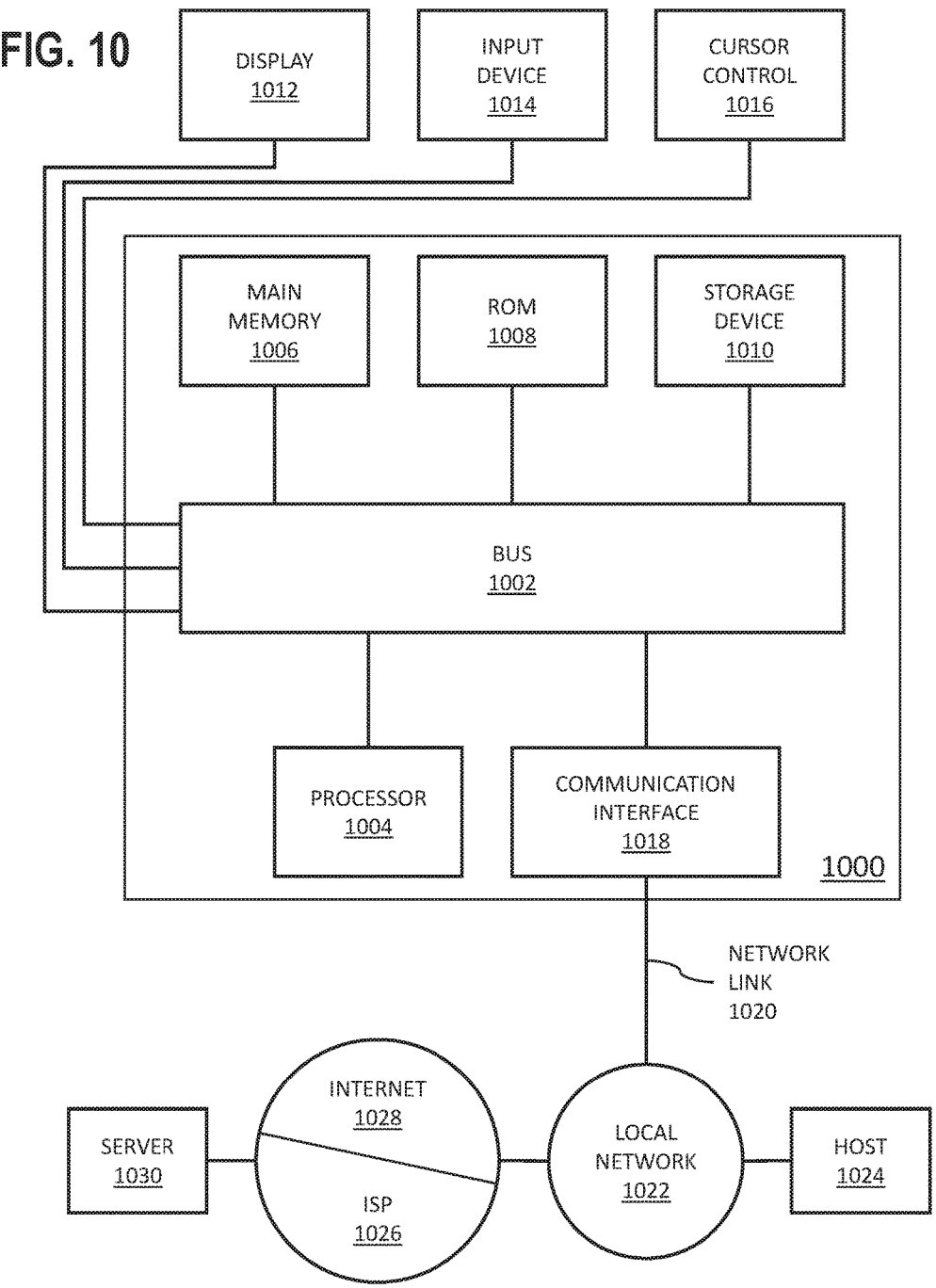

MANAGING SPLIT PACKAGES IN A MODULE SYSTEM

TECHNICAL FIELD

The present disclosure relates to packages. In particular, the present disclosure relates to split packages in a module system.

BACKGROUND

In computer systems, the term "resource" typically refers to non-code content. Examples of resources include text, images, audio, video, etc. In some cases, multiple versions of a particular resource may exist. The different versions may be interchangeable, depending on one or more conditions. For example, localization is the process of supplying different versions of an application to users who speak different languages. A particular application may have an English version, a French version, etc. Accordingly, one version of a resource may include application text in English, another version of the resource may include application text in French, etc. As another example, an application may have different versions of resources that are used depending on a non-language-related user preference, such as a parental control setting in a videogame. As another example, an application may have different versions of resources depending on the user's application licensing status (e.g., free, open source, trial, paid, premium, etc.), such as different lists of application features that are available to the user under the current license. Many different situations exist where different versions of resources may be used.

Different versions of resources may be supported in many different ways. Different versions of properties files may be used to store and retrieve different versions of resources. For example, in a Java environment, properties files may be stored and/or opened using objects of type "java.util.ResourceBundle" or "java.util.PropertyResourceBundle." A predetermined key may be used to look up a corresponding property. For example, performing a property lookup using a key called "greeting" may return the word "hello" in an English version and "bonjour" in a French version. Alternatively or in addition, location-independent resource lookup may be supported. For example, in a Java environment, a "ClassLoader::getResource(r)" method call may be used to locate the resource bundle on the classpath, where r is the name of a specific version of the resource. The application code performing the lookup needs to know the name of the resource but not its specific location.

Different versions of a resource may be stored in different locations. In a module system, different versions may be stored in different modules. For example, in a Java-based module system, a module may be represented as a Java archive file (JAR). Each JAR may correspond to a single module, which may be referred to as a modular JAR. The module system may also include a separate module with the main application code. Thus, for a hypothetical application with both English and German versions, there may be a module with the main application code (e.g., "main.jar"), a module with English-language resources (e.g., "app.en.jar"), and a module with German-language resources (e.g., "app.de.jar"). Separating different versions of resources into different modules and/or JARs may allow application developers to more readily add or modify versions without affecting other versions.

Even if different versions of resources are stored in separate modules, the different versions may be associated with (e.g., declared as belonging to) the same package. For example, in a Java environment, "com.oracle.weblogic.en" and "com.oracle.weblogic.de" both are in the "com.oracle.weblogic" package. In other words, packages of the same name are found in different modules. A situation where packages of the same name are found in different modules may be referred to as a "split package." A split package may be a security concern. For example, objects of different classes, in packages of the same name, may be permitted to read each other at compile-time and/or runtime. Thus, code or resources that were not intended to be read by other modules may nonetheless be accessible by other modules. Alternatively or in addition, a split package may affect system stability by increasing the possibility of runtime errors and/or unpredictable application behavior. For example, one module may include an old version of a particular class file, and another module may include a newer version of the same class file, both versions being associated with the same package name. If both modules are allowed in the module system simultaneously, it may be difficult or impossible to know which version is being used at runtime, resulting in unstable system performance.

Because of security and/or stability concerns such as those discussed above, a module system may require that a particular package name be used in only a single module (e.g., a single modular JAR). This restriction may help avoid code conflicts and/or inadvertent code leakage. However, as discussed above, an application developer may attempt to store different versions of resources in different modules, associated with the same package name. Thus, a module system that categorically prohibits split modules may not support the application developer's preferred approach to organizing code and resources.

To allow for different modules associated with the same package name, a module system may support different types of modules and/or module component, with one or more types of modules/components allowing split packages and one or more other types of modules/components not allowing split packages. For example, Open Service Gateway Initiative (OSGi) supports host bundles and fragment bundles, underneath a module layer. However, supporting different types of modules requires the application developer(s) to keep track of the types of each module, as well as the rules surrounding the use of each type of module and the relationships between different types of modules.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
   2.4 MODULE AND NON-MODULE ENVIRONMENTS
3. IDENTIFYING CODE CONFLICTS
4. GENERATING A MODULE MEMBERSHIP RECORD
5. ILLUSTRATIVE EXAMPLE
6. MISCELLANEOUS; EXTENSIONS
7. HARDWARE OVERVIEW
8. COMPUTER NETWORKS AND CLOUD NETWORKS
9. MICROSERVICE APPLICATIONS

1. General Overview

One or more embodiments include techniques for managing split packages in a module system. A code conflict exists between two packages, in different modules, based at least in part on the packages being named identically and including executable code. No code conflict exists between two other identically-named packages, in different modules, based at least in part on the packages not including any executable code. Managing split packages may be based, at least in part, on module membership records associated with the modules.

One or more embodiments described in this Specification and/or recited in the claims may not be included in this General Overview section.

2. Architectural Overview

Figure 1:
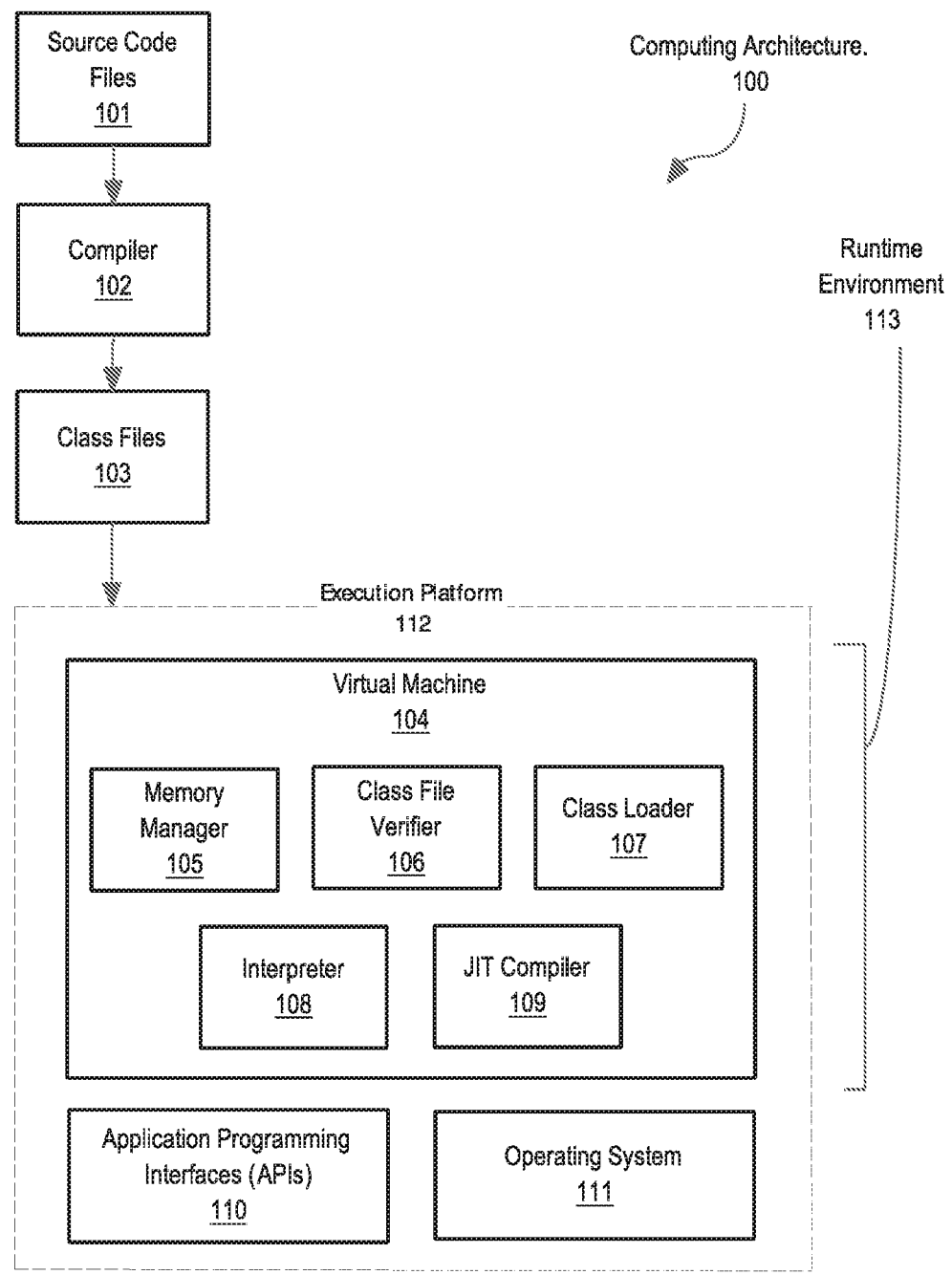
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
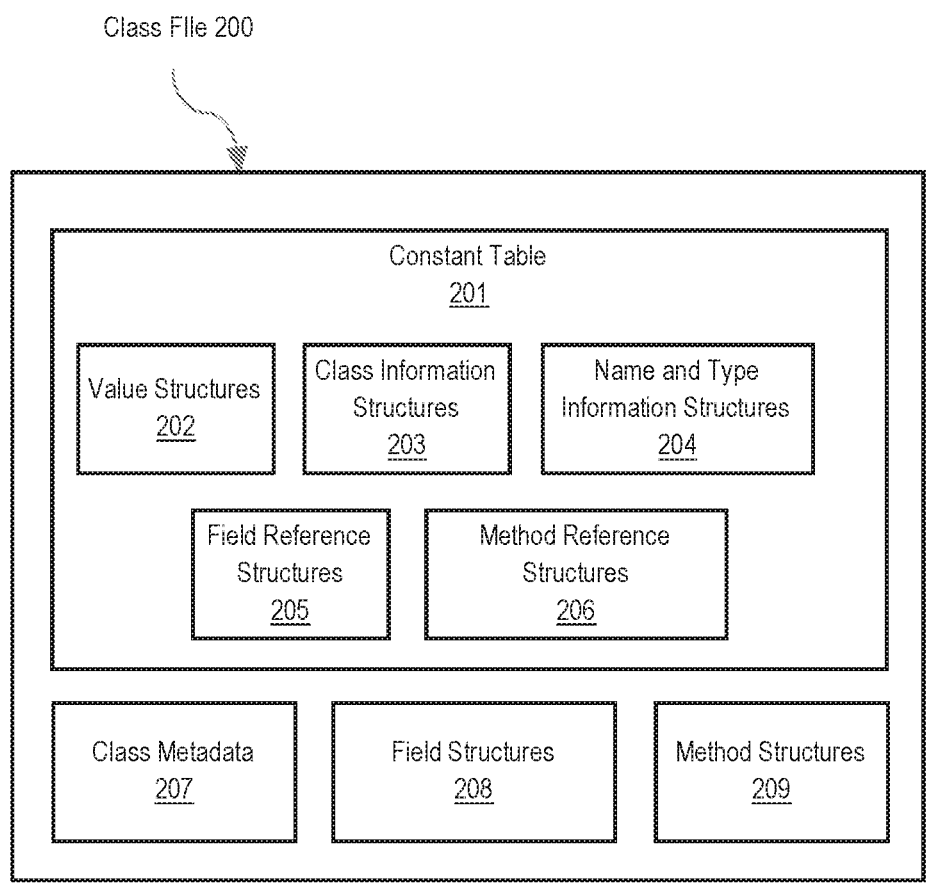
FIG. 2 is a block diagram illustrating an embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
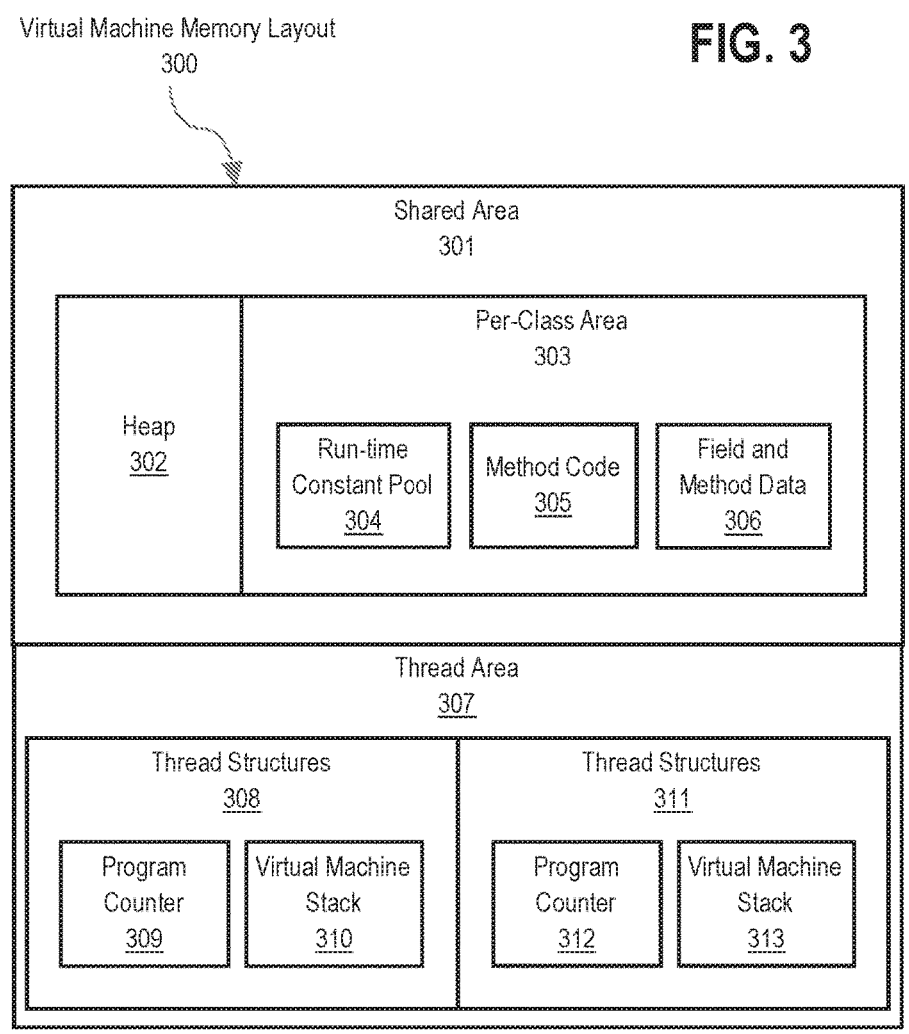
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
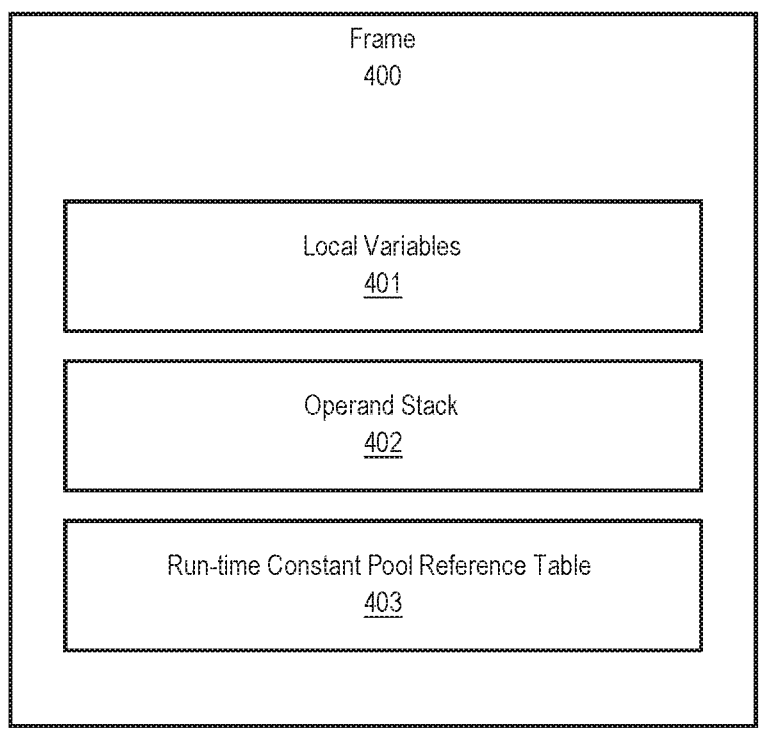
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

2.4 Module and Non-Module Environments

Computing platforms for developing and maintaining software generally rely on one of two kinds of systems: non-module systems and module systems.

A non-module system refers to a system in which dependencies between different pieces of code are not strictly declared or restricted. An industry-defined term "JAR hell" refers to example uses of Java Archive (JAR) files in a non-module system which result in problems, for example, with the class loading process.

A module system includes a collection of named modules and defines how the collection of named modules work together. Each particular named module in the collection of named modules may explicitly define dependencies on other named modules (or the contents thereof). However, named modules are typically restricted from explicitly depending on any non-module code.

Figure 5:
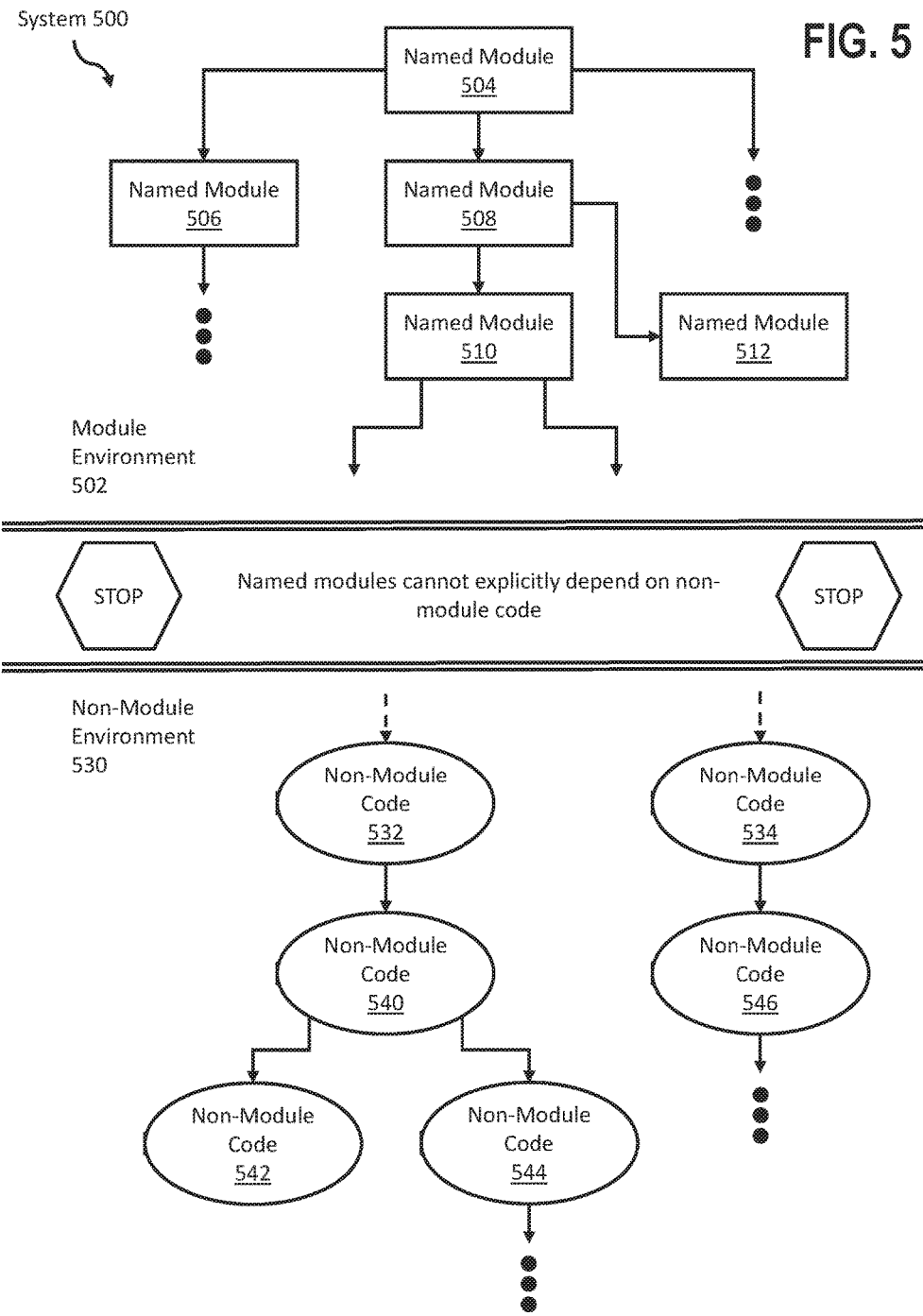
FIG. 5 illustrates named modules in a module environment and non-module code in a non-module environment.

FIG. 5 illustrates examples of systems in accordance with one or more embodiments. Other embodiments may include more or fewer devices and more or fewer components than illustrated in the systems and/or described below. Hardware components, software components, and/or functionality described as corresponding to one device may instead correspond to another device. Components illustrated separately may be combined into a single component or implemented on a single device. Accordingly, the scope of the claims should not be construed as being limited by the specific examples herein.

As illustrated in FIG. 5, a system 500 includes components of a module environment 502 and components of a non-module environment 530. The non-module environment 530 includes non-module code 532-546. Dependencies between different non-module code are not required to be explicitly declared. Accordingly, when a first non-module code depends on a second non-module code, the software development environment must search for the second non-module code in all files of a set of files associated with all of the code. The dependencies between different non-module code (which may not be explicitly declared) are illustrated in FIG. 5 using arrows. For example, the dependency of non-module code 532 on non-module code 540 is illustrated using an arrow beginning at non-module code 532 and ending at non-module code 540. Furthermore, a dependency of non-module code 540 on non-module code 542 and non-module code 544 is illustrated using two arrows beginning at non-module code 540 and ending at non-module code 542 and non-module code 544, respectively.

The module environment 502 includes a set of named modules (e.g., named modules 504-512). Dependencies between different named modules in a module environment, such as module environment 502, are explicitly declared by the modules. An explicitly declared dependency may be referred to herein as an "explicit dependency." The explicit dependencies between different named modules (or contents thereof) in module environment 502 are also illustrated using arrows. For example, the explicit dependency of named module 504 on named module 508 is illustrated using an arrow starting at named module 504 and ending at named module 508. Further, the explicit dependency of named module 508 on named module 510 is illustrated using an arrow starting at named module 508 and ending at named module 510.

As illustrated in FIG. 5, there is a partition between module environment 502 and non-module environment 530. Specifically, named modules cannot explicitly depend on non-module code. For example, named module 510 cannot explicitly depend on non-module code 532. As a result, module environments comprising named modules cannot be built on top of non-module environments comprising non-module code.

In the Java Module System, a keyword "requires" is used to declare explicit dependencies. The keyword "requires" may be used with a parameter identifying another component or identifying a dependency path (e.g., CLASSPATH). An explicit dependency on a dependency path allows for depending on the parameters associated with the dependency path. In an example, a first component depends on a second component, either directly or via a dependency path.

In addition, the ability of a first module to access particular module code and/or resources in a second module may be contingent on the second module exposing the particular module code and/or resources to the first module. For example, the second module may include two packages. The second module may expose one of the packages to the first module, but not the other package. In this example, the first module may be able to access code and/or resources in the exposed package, but not in the non-exposed package. In the Java Module System, an "exports" keyword may be used to expose module elements to other modules. Alternatively or in addition, a module element may be considered exposed if it is open to reflective operations at runtime. In other words, a package may be considered "open," even if it is not also "exported," if another module (i.e., other than the module containing the package) has been granted access to access code and/or resources in the package via reflective operations. In a Java environment, a package may be opened to reflective operations using an "opens" keyword.

3. Identifying Code Conflicts

Figure 6:
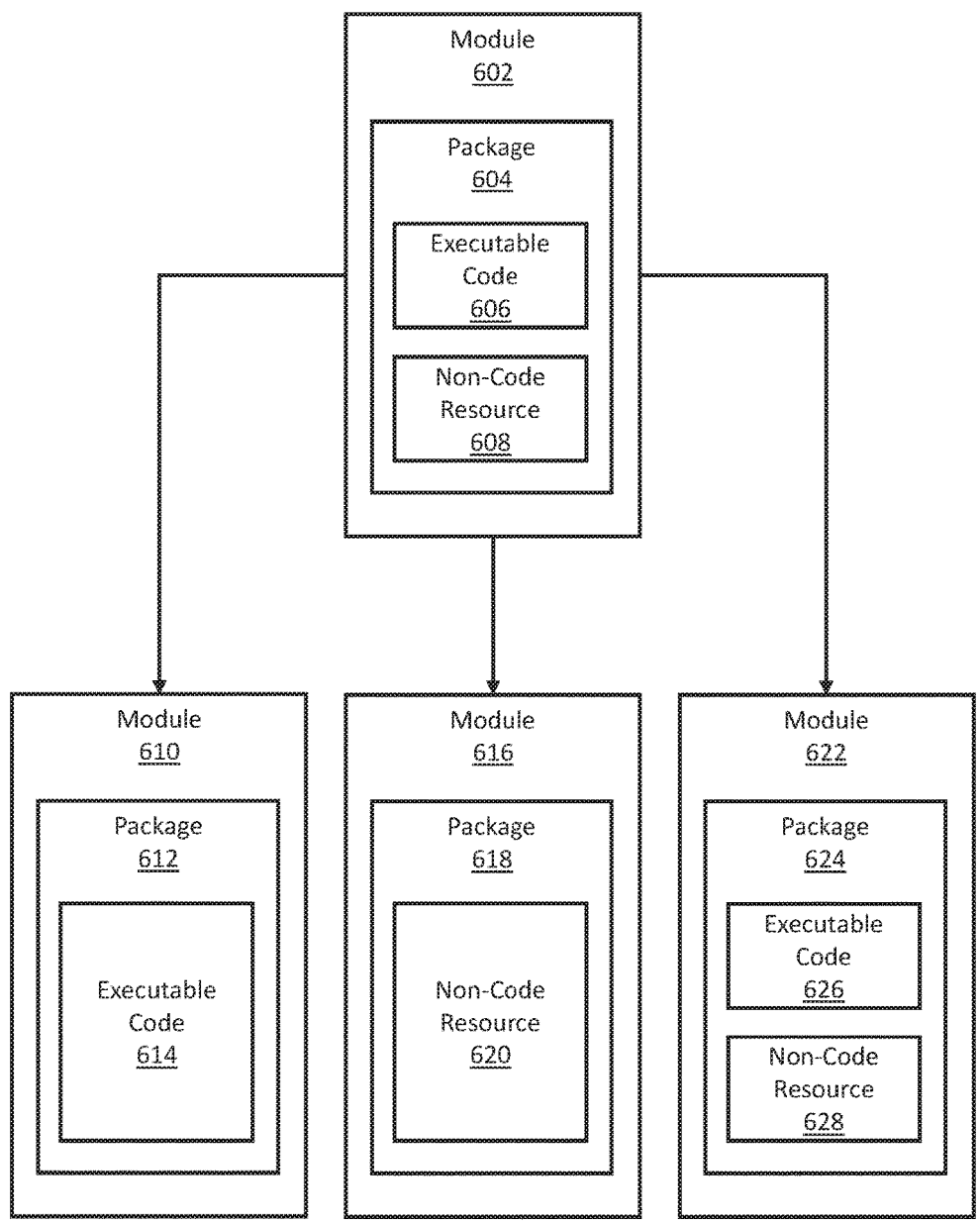
FIG. 6 illustrates modules in accordance with one or more embodiments.

As noted above, a situation where packages of the same name are found in different modules may be referred to as a "split package." FIG. 6 illustrates modules in accordance with one or more embodiments. The modules illustrated in FIG. 6 are provided for exemplary purposes only and should not be construed as limiting one or more embodiments. As illustrated in FIG. 6, a module 602 includes a package 604. A module may include multiple packages. In this example, the package 604 includes both executable code 606 and a non-code resource 608. A package may include multiple sets of executable code and/or multiple non-code resources.

In FIG. 6, module 602 depends on three other modules: module 610, module 616, and module 622. Module 612 includes a package 612 with only executable code 614. Module 616 includes a package 618 with only a non-code resource 620. Module 622 includes a package 624 with both executable code 626 and a non-code resource 628.

If two or more of package 604, package 610, package 616, and package 622 have identical names, the module system may treat those packages as a split package. However, not all split packages share the same security and/or stability concerns. For example, if package 618, which does not include any executable code, is named identically to one of the other packages, there cannot be a code conflict between the identically-named packages. In general, there cannot be a code conflict between two packages, if one of the packages does not include any executable code. However, there could be a conflict between two or more of executable code 606, executable code 614, and executable code 626. For example, if package 610 and package 622 are named identically, there could be a conflict between older and newer versions of code in the two packages. In general, there may be a potential for a code conflict whenever two identically-named packages both include executable code. Similarly, security concerns relating to readability between two identically-named packages may be greater if both packages include executable code than if one of the packages includes only non-code resources.

Figure 7:
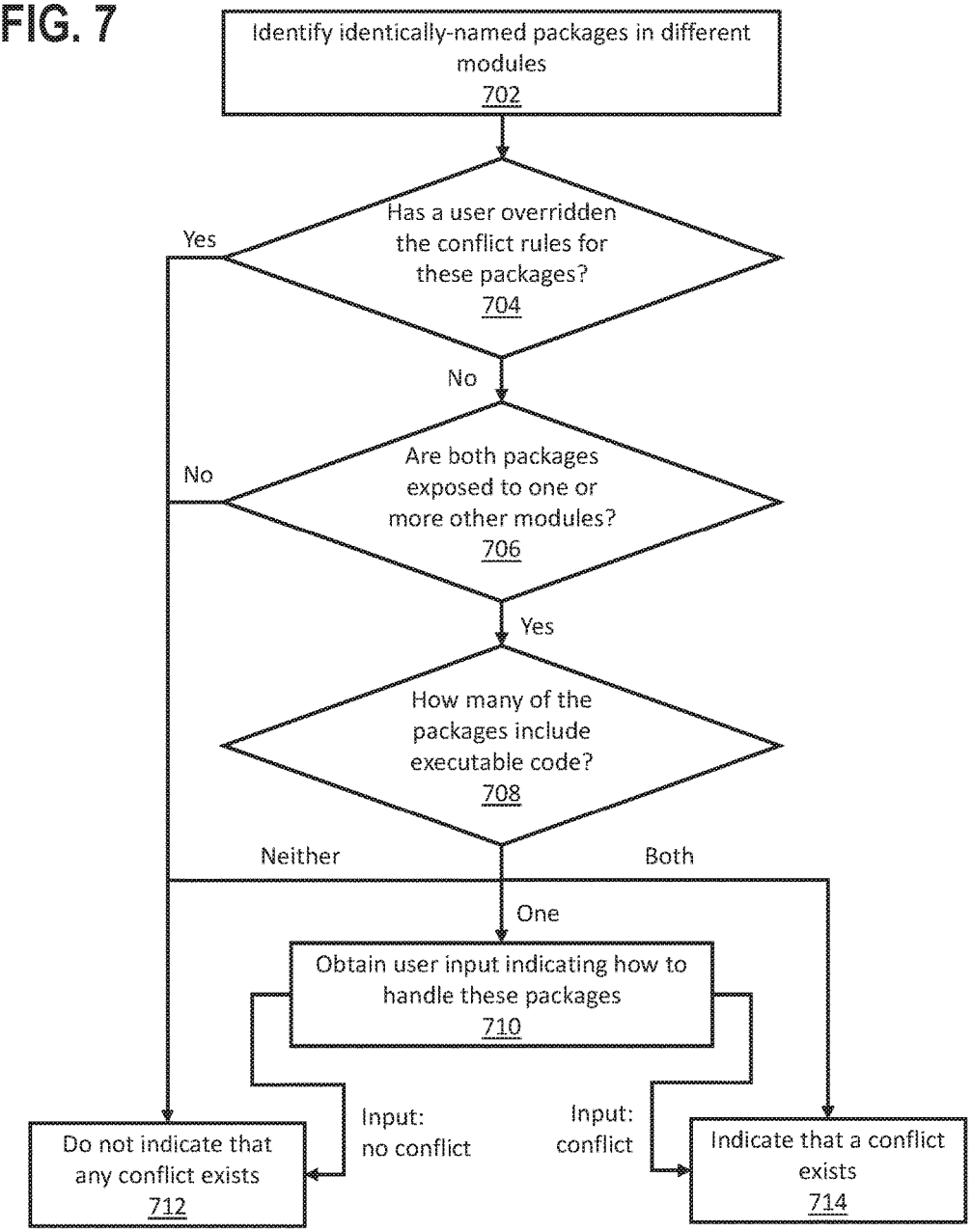
FIG. 7 illustrates a set of operations for identifying code conflicts in a module system, in accordance with one or more embodiments.

FIG. 7 illustrates a set of operations for identifying code conflicts in a module system, in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

In one or more embodiments, two (or more) identically-named packages, in different modules, are identified (Operation 702). The identically-named packages may be identified during software development, for example, by an integrated development environment (IDE) that tracks the names and relationships between different modules, including their respective packages and other elements. Alternatively, the identically-named packages may be identified at compile-time, when module source code is being converted to executable instructions such as bytecode. Alternatively, the identically-named packages may be identified at load-time, by a process that loads compiled modules into the module system for execution. Alternatively, the identically-named packages may be identified at runtime. Other operations described herein may likewise be performed during development, at compile-time, at load-time, at runtime, or any combination thereof.

In an embodiment, identically-named packages are identified during resolution of a module dependency graph, in which the module system identifies which modules depend on other modules, which packages are exposed to other modules, etc. Resolution of the module dependency graph may be based, in part, on module membership records associated, respectively, with the different modules in the module system. A particular module's module membership record may indicate, for example, the name of the module, the names of packages included in the module, which packages are exposed to which other module(s), which other module(s) are depended upon by this module, and/or any other type of information about the module or combination thereof. Generating a module membership record is discussed in further detail below.

In an embodiment, as discussed below, even though a particular package does belong to a particular module, the module's corresponding module membership record may not indicate that the package belongs to the module. The module system may depend on module membership records to identify code conflicts between packages in different modules. The absence of a package from a module membership record may result, implicitly, in the module system failing to identify any code conflict involving that particular package. Accordingly, one or more of the operations describe herein may be viewed as implicit logical outcomes of a particular system state, rather than an explicit operation. For example, not indicating that any conflict exists between two packages (Operation 712, below) may be an implicit logical outcome of omitting one or both packages from their respective module membership records; the module system may simply not include the omitted package(s) when checking for conflicts. Similarly, when identically-named modules are identified (Operation 702), the fact that they have identical names may not be explicitly recognized by the system if one or both packages are not listed in their respective module membership records. However, a system state resulting in a particular implicit logical outcome may be the result of one or more explicit operations, such as operations involved in generating a module membership record.

Continuing with discussion of FIG. 7, in an embodiment, a determination is made of whether a user has overridden the conflict rules for the packages in question (Operation 704). Specifically, a user may override a conflict rule so a conflict is ignored where it would otherwise be identified. For example, a conflict rule may prohibit split packages where both packages include executable code. Overrides may be established at different levels, such as one package name, a set of package names, all package names, a particular module, a set of modules, all modules, etc. In addition, overrides may be established in many different ways. For example, a user may override a conflict rule via a setting in an IDE, a command line argument to a module assembly tool (e.g., to a "jar" command), a command line argument to a compiler (e.g., to a "javac" command), a command line argument to a module loader (e.g., to a "java" command), a system variable, or some other way. In an embodiment, if a conflict rule has been overridden, then no conflict is indicated (Operation 712) even if conditions that satisfy the conflict rule exist.

In an embodiment, a determination is made of whether both packages are exposed to one or more other modules (Operation 706). A split package may only be problematic if the contents of both packages are exposed to one or more other modules. Specifically, code and/or resources that are not exposed may not be accessible by other modules at runtime. In other words, one or both packages may be strictly internal to their respective modules. In this case, the security and/or stability concerns normally associated with split packages may be minimal or non-existent. Thus, in an embodiment, if one or both packages are not exposed to other modules, then no conflict is indicated (Operation 712), even if the packages both include executable code.

In an embodiment, a determination is made of how many of the packages include executable code (Operation 708). If neither package includes executable code, then there may be little or no possibility of code conflicts between the packages. (There may still be the possibility of a code conflict, however, if the module system allows for executable code to be injected into packages at runtime.) For example, both packages may include only non-code resources. In an embodiment, if neither package includes executable code, then no conflict is indicated (Operation 712).

In an embodiment, if only one of the packages includes executable code, the decision of whether to indicate a conflict may be deferred to a user. Specifically, user input indicating how to handle these packages may be obtained (Operation 710). The user input may be obtained via a command line prompt, a widget in a graphical user interface (GUI) (e.g., a GUI of an IDE), a request for additional command line parameters, or in some other way. The user input may apply to a specific set of two identically-named packages, or may apply to all situations where only one of two identically-named packages includes executable code. Depending on the user input, a conflict may be indicated for the identically-named packages (Operation 714) or may not be indicated (Operation 712).

In an embodiment, if both packages include executable code, then a code conflict exists and the conflict may be indicated (Operation 714). Depending on when and how the conflict is identified, the conflict may be indicated as a command line warning, by logging the conflict in an error log, by presenting a message in a GUI, by terminating the application, by preventing one or more modules from loading, by preventing the module system from starting, or in any other way to inform a user that a conflict exists, or combination thereof. In embodiment, the packages are not further evaluated to determine whether any types overlap (i.e., have identical names) between the packages. Alternatively, the packages may be further evaluated and the conflict may be indicated only if there are overlapping types.

In an embodiment, determining whether or not to indicate a conflict depends on one or more additional determinations (not illustrated in FIG. 7). As an example, two modules include identically-named packages, both with code. An analysis of the two packages indicates that they do not include any identically-named classes. In this example, the risk of competing versions of the same code may be reduced or nonexistent. Accordingly, the split package may be allowed without indicating a conflict, even though two identically-named packages include code. As another example, code in one package does not reference any code in another identically-named package. It may be inferred from the absence of any cross-references between the packages that no conflict exists. Many different factors may be involved in determining whether to indicate a conflict.

4. Generating a Module Membership Record

Figure 8:
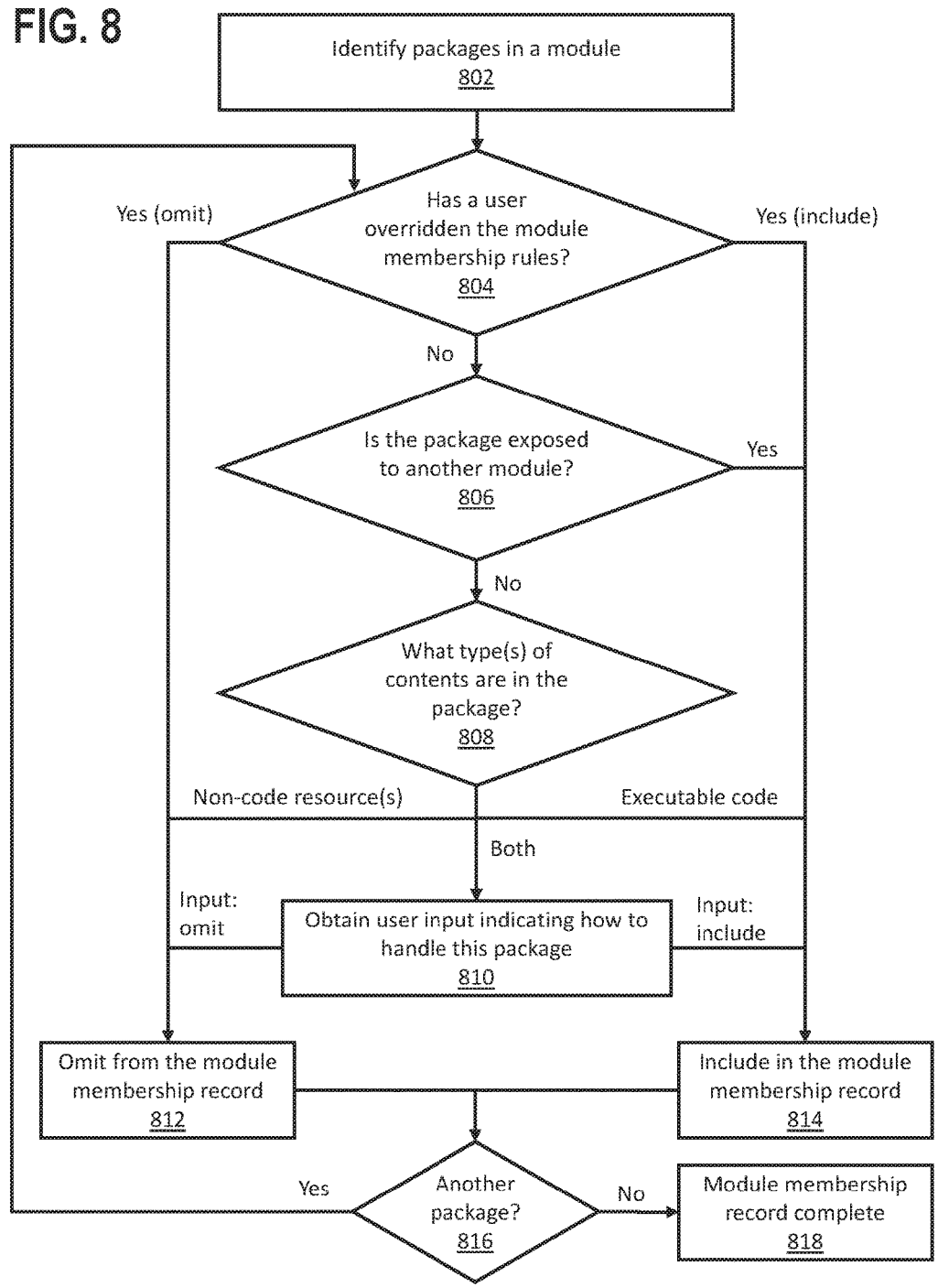
FIG. 8 illustrates a set of operations for generating a module membership record in accordance with one or more embodiments.

As discussed above, a determination of whether a code conflict exists between identically-named packages may be based, at least in part, on module membership records of the corresponding modules. FIG. 8 illustrates an example set of operations for generating a module membership record in accordance with one or more embodiments. One or more operations illustrated in FIG. 8 may be modified, rearranged, or omitted all together. Accordingly, the particular sequence of operations illustrated in FIG. 8 should not be construed as limiting the scope of one or more embodiments.

In an embodiment, a module is declared in source form. For example, in a Java environment, the source form may be named "module-info.java." The source form identifies module names, module dependencies, which packages are exposed by the module, and/or any other type of information about the module and its components. Additional information may include annotations. For example, in a Java environment, the following annotation indicates that the corresponding module includes native (i.e., non-Java) code targeting a specific computing platform. The ellipses represent the contents of the module:

```
@ContainsNativeCode("linux-arm64")
Module M { ... }
```

In an embodiment, the source form of the module does not indicate which package(s) are internal to the module, i.e., not exposed.

In an embodiment, the source form of the module is compiled by a compiler. For example, in a Java environment, a "javac" command may be used to compile "module-info.java" to "module-info.class." The compiled form may be referred to as the "module descriptor." A module membership record may subsequently be generated and included in the module descriptor. The module membership record indicates at least those packages that are internal to the module, i.e., not exposed. The module membership record may also indicate those packages that are exposed by the module. In general, as used herein, the term "module membership record" may apply to any record, or combination of records, indicating packages that are included in a particular module. A compiler may generate the module membership record in the process of compiling the module descriptor. Alternatively, the module membership record may be generated during module assembly. In general, a "module assembler" refers to a command or process that assembles the module's executable code and/or resources into a modular form. For example, in a Java environment, a "jar" command may be used to assemble a module's code and/or resources into a modular JAR (the modular form) that also includes the corresponding module descriptor. The module membership record may be included in the module descriptor, included elsewhere in the modular form, or otherwise associated with the modular form. Alternatively, another tool may generate the module membership record. For example, in a Java environment, a "jlink" tool may be used to assemble code and/or resources for multiple modules into a Java runtime image, and may also generate module membership records for the linked modules. The "jlink" tool may store the module membership records in the corresponding module descriptors and/or elsewhere in the Java runtime image. The module membership record may be generated in many different ways, by many different types of processes, and may be stored in many different ways. Accordingly, references to a module assembler in the following discussion should not be construed as limiting one or more embodiments.

As discussed below, one or more packages may be omitted from the module membership record. If module membership records are used to check for code conflicts, then omitting a package from a module membership record may result in that package being ignored in the code conflict check(s). In an embodiment, the module assembler identifies packages in a module (Operation 802). For example, the module assembler may identify packages by traversing one or more directory structure(s) identified as a starting point for the module and/or identified as being associated with the module. Packages may be identified according to the locations of source code and/or non-code resources in the directory structure, by declarations within files, and/or by any other means suitable for identifying packages in a module.

In an embodiment, for a particular module, the module assembler determines whether a user has overridden one or more module membership rules (Operation 804). A user may override a rule indicating that certain types of packages must be included in a module membership record. For example, a module membership rule may indicate that any package that (a) includes executable code and/or (b) is exposed to another module must be included in the module membership record. Alternatively or in addition, a user may override a rule indicating that certain types of packages should not be included in a module membership record. For example, a module membership rule may indicate that any package without executable code should not be included in the module membership record. In other words, a user may override a module membership rule in such a way as to force the module assembler to either include the package in the module membership record (Operation 814) or omit the package from the module membership record (Operation 812). The user may override a module membership rule via a command line argument (e.g., to a "jar" command), via a system-wide setting, via a preference in a GUI of an IDE, or in some other way.

In an embodiment, the module assembler determines whether the package is exposed to another module (Operation 806). As noted above, a module membership rule may indicate that any package exposed to another module must be included in the module membership record, even if the package does not include any executable code. In an embodiment, if the package is exposed to another module, then the package is included in the module membership record (Operation 814).

In an embodiment, a determination is made of the type(s) of contents in the package (Operation 808). If the package only includes non-code resources, then the package may be omitted from the module membership record (Operation 812). If the package includes only executable code, the package may be included in the module membership record (Operation 814). If the package includes both executable code and non-code resources, the module assembler may treat the package in the same manner as a package that contains only code. Alternatively, the module assembler may obtain user input indicating how to handle this package (Operation 810). Specifically, the user input may indicate whether to include the package in the module membership record (Operation 814) or omit the package from the module membership record (Operation 812). The user input may be obtained via a command line prompt, a widget in a graphical user interface (GUI) (e.g., a GUI of an IDE), a request for additional command line parameters, or in some other way. The user input may apply to a specific package, or may apply to all packages that include both executable code and non-code resources.

In an embodiment, when a particular package has been either included or omitted in the module membership record, the module assembler determines whether there are any more packages to evaluate (Operation 816). If there are more packages to evaluate, the process repeats. If there are no more packages to evaluate, then the module membership record is complete (Operation 818), at least with respect to which package(s) should be included or omitted. Additional operations (not shown) may be needed to finalize the module membership record.

In an embodiment, operations discussed herein may also be applicable to so-called "bridge modules." A bridge module is a module used as an interface between module code and non-module code. Specifically, a bridge module references non-module code, and other modules may depend on the bridge module to gain access to the non-module code. Bridge modules are discussed in further detail in U.S. patent application Ser. No. 14/808,689, titled "Bridging a Module System and a Non-Module System," filed Jul. 24, 2015 and incorporated herein by reference. Some modifications may be required for one or more operations to apply to bridge modules. For example, to determine which packages are referenced by a bridge module, the module assembler may need to scan all class files in the classpath. For each package encountered in the classpath, the module assembler may determine whether the package includes any executable code or includes only non-code resources. Thus, split packages may be allowed even for non-module code, based on rules similar to those applied to modules.

5. Illustrative Example

A detailed example is described below for purposes of clarity. Components and/or operations described below should be understood as one specific example which may not be applicable to certain embodiments. Accordingly, components and/or operations described below should not be construed as limiting the scope of any of the claims.

Figure 9:
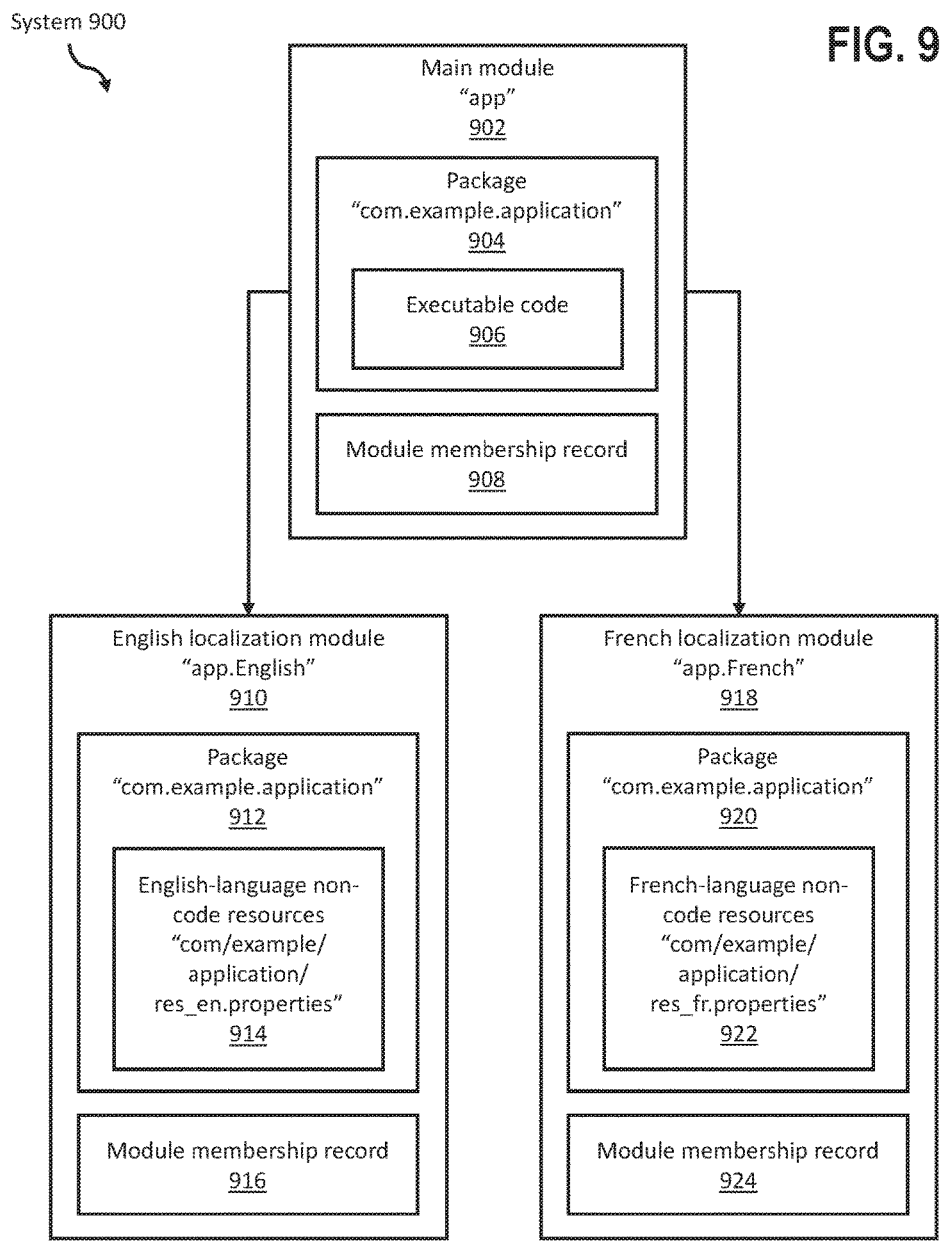
FIG. 9 is a block diagram illustrating an example in accordance with one or more embodiments.

FIG. 9 is a block diagram illustrating an example in accordance with one or more embodiments. In this example, an application has been localized for both English and French. That is, the application has both English and French versions. A main module 902, named "app," includes a package 904, named "com.example.application." The package 904 includes executable code 906 supplying the main application logic. A module membership record 908 includes information about the module, including that the package 904 belongs to the main module 902. The main module 902 depends on two localization modules: an English localization module 910, named "app.English," and a French localization module 918, named "app.French."

The English localization module 910 includes English-language non-code resources 914. The English-language non-code resources 914 can be loaded (for example, using location-independent resource lookup) by the executable code 906, using the name "com/example/application/res_en.properties." However, the English-language non-code resources 914 are in a package 912, named "com.example.application." Because the package 912 includes only non-code resources, a module membership record 916 associated with the English localization module 910 does not indicate that the package 912 belongs to the English localization module 910.

The French localization module 918 includes French-language non-code resources 922. The French-language non-code resources 922 can be loaded (for example, using location-independent resource lookup) by the executable code 906, using the name "com/example/application/res_fr.properties." However, the French-language non-code resources 922 are in a package 920, named "com.example.application." Because the package 920 includes only non-code resources, a module membership record 924 associated with the French localization module 918 does not indicate that the package 920 belongs to the French localization module 918.

In this example, package 904, package 912, and package 920 all belong to different modules but are identically named. However, because module membership record 916 omits package 912 and module membership record 924 omits package 920, no code conflict will be identified when the system 900 attempts to load and execute the main module 902. Thus, localization is permitted with different non-code resources in packages having the same name. In other words, a split package (in this case, split across three modules) is permitted based on two of the packages including only non-code resources. If one of the localization packages had also included executable code, then a code conflict may have been identified, as discussed above.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager. In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   generating a first module membership record, for a first module in a module system that specifies accessibility of each module in a plurality of modules to other modules in the plurality of modules, at least by:
      identifying a first set of one or more packages in the first module;
      determining that a first package, from the first set of one or more packages, comprises a first set of executable code;
      based at least in part on determining that the first package comprises the first set of executable code: including, in the first module membership record, an indication that the first package belongs to the first module;
   generating a second module membership record, for a second module in the module system, at least by:
      identifying a second set of one or more packages in the second module;
      determining that a second package, from the second set of one or more packages, does not comprise any sets of executable code;
      based at least in part on determining that the second package does not comprise any sets of executable code: omitting, from the second module membership record, any indication that the second package belongs to the second module;
   determining, based at least on the first module membership record and the second module membership record, whether a code conflict exists in the module system,
   wherein generating the first module membership record, generating the second module membership record, and determining whether the code conflict exists are performed by executable code associated with one or more of: an integrated development environment (IDE), a compiler, a loader, a runtime environment, a module assembler, or a runtime image assembler.

2. The one or more media of claim 1, further storing instructions which, when executed by one or more processors, cause:
   identifying a third set of one or more packages in a third module, wherein a third package, from the third set of one or more packages, does not comprise any sets of executable code;
   receiving a user-generated instruction to include the third package in a third module membership record for the third module; and
   generating the third module membership record, wherein based at least in part on the user-generated instruction, the third module membership record indicates that the third package belongs to the third module.

3. The one or more media of claim 1, further storing instructions which, when executed by one or more processors, cause:
   identifying a third set of one or more packages in a third module, wherein a third package, from the third set of one or more packages, comprises a second set of executable code;
   receiving a user-generated instruction to omit the third package from a third module membership record for the third module; and
   generating the third module membership record, wherein based at least in part on the user-generated instruction, the third module membership record does not indicate that the third package belongs to the third module.

4. The one or more media of claim 1, further storing instructions which, when executed by one or more processors, cause:
   identifying a third set of one or more packages in a third module, wherein a third package, from the third set of one or more packages, does not comprise any sets of executable code;
   determining that the third module exposes the third package to at least one other module;
   generating a third module membership record for the third module, wherein based at least in part on the third module exposing the third package to at least one other module, the third module membership record indicates that the third package belongs to the third module.

5. The one or more media of claim 1, further storing instructions which, when executed by one or more processors, cause:
   identifying a third set of one or more packages in a third module, wherein a third package, from the third set of one or more packages, comprises both a second set of executable code and a non-code resource file;

requesting, based on the third package comprising both the second set of executable code and the non-code resource file, user input to indicate whether or not a third module membership record for the third module should indicate that the third package belongs to the third module.

6. The one or more media of claim 1, further storing instructions which, when executed by one or more processors, cause:

performing a first lookup of a first non-code resource in the second package of the second module; and performing a second lookup of a second non-code resource in a third package of a third module, wherein the second package and the third package are named identically, wherein based at least in part on the third package not comprising any sets of executable code, a third module membership record, associated with the third module, does not indicate that the third package belongs to the third module, and wherein based at least in part on (a) the second module membership record not indicating that the second package belongs to the second module and (b) the third module membership record not indicating that the third package belongs to the third module, no code conflict is identified between the second module and the third module.

7. The one or more media of claim 1, further storing instructions which, when executed by one or more processors, cause:

determining, based on a third module membership record for a third module, that a third package of the third module is named identically to the first package; and indicating, responsive to determining that the third package is named identically to the first package, a code conflict.

8. The one or more media of claim 1, further storing instructions which, when executed by one or more processors, cause: determining that the second package comprises at least one non-code resource file.

9. The one or more media of claim 8, wherein the at least one non-code resource file comprises at least one of a text file, an audio file, or an image file.

10. The one or more media of claim 1, wherein the second module membership record not indicating that the second package belongs to the second module is further based on a determination that the second module does not expose the second package to any other module.

11. The one or more media of claim 1, wherein generating the first module membership record and generating the second module membership record are performed by one or more module assemblers.

12. The one or more media of claim 1, wherein identifying the first set of one or more packages in the first module comprises traversing the first module, and wherein the first set of one or more packages comprises at least one package that is not exposed by the first module to any other module.

13. One or more non-transitory machine-readable media storing instructions which, when executed by one or more processors, cause:

identifying a first package in a first module;

identifying a second package in a second module;

determining that (a) the first package and the second package are named identically and (b) the first package and the second package each comprise corresponding executable code;

determining, based at least in part (a) and (b), that a first code conflict exists between the first module and the second module;

identifying a third package in a third module;

identifying a fourth package in a fourth module;

determining that (c) the third package and the fourth package are named identically and (d) at least one of the third package and the fourth package does not comprise any executable code; and determining, based at least in part on (c) and (d), that no code conflict exists between the third module and the fourth module, wherein identifying the first package, identifying the second package, determining (a) and (b), determining that the first code conflict exists between the first module and the second module, identifying the third package, identifying the fourth package, determining (c) and (d), and determining that no code conflict exists between the third module and the fourth module are performed by executable code associated with one or more of: an integrated development environment (IDE), a compiler, a loader, a runtime environment, a module assembler, or a runtime image assembler.

14. The one or more media of claim 13, wherein the first determination and the second determination are based, respectively, at least in part on module membership records of the first module, the second module, the third module, and the fourth module.

15. The one or more media of claim 13, further storing instructions which, when executed by one or more processors, cause:

identifying a fifth package in a fifth module;

identifying a sixth package in a sixth module;

determining that (e) the fifth package and the sixth package are named identically and (f) at least one of the fifth package and the sixth package comprises both executable code and a non-code resource; and requesting, based at least in part on (e) and (f), user input to indicate whether a second code conflict exists between the fifth module and the sixth module.

16. The one or more media of claim 13, further storing instructions which, when executed by one or more processors, cause:

performing a first lookup of a first non-code resource in the third package of the third module; and performing a second lookup of a second non-code resource in the fourth package of the fourth module.

17. The one or more media of claim 13, further storing instructions which, when executed by one or more processors, cause:

determining that the third package and the fourth package each comprise, respectively, at least one non-code resource file.

18. The one or more media of claim 17, wherein the at least one non-code resource file comprises at least one of a text file, an audio file, or an image file.

19. The one or more media of claim 13, wherein determining that no code conflict exists between the third module and the fourth module is further based on:
   determining that the third module does not expose the third package to any other modules; and/or
   determining that the fourth module does not expose the fourth package to any other modules.

20. The one or more media of claim 13, wherein determining (a), (b), (c), and (d) is performed by one or more module assemblers.

\* \* \* \* \*

UNITED STATES PATENT AND TRADEMARK OFFICE
CERTIFICATE OF CORRECTION

PATENT NO. : 10,394,610 B2
APPLICATION NO. : 15/721837
DATED : August 27, 2019
INVENTOR(S) : Buckley et al.

Page 1 of 1

It is certified that error appears in the above-identified patent and that said Letters Patent is hereby corrected as shown below:

On the Title Page

Item (73) Assignee, Line 2, delete "Redmond Shores" and insert -- Redwood Shores --, therefor.

In the Drawings

On sheet 2 of 10, in FIG. 2, under Reference Numeral 200, Line 1, delete "Flle" and insert -- File --, therefor.

In the Specification

In Column 8, Line 18, delete "add12andl3" and insert -- add12and13 --, therefor.

Signed and Sealed this
Twenty-fifth Day of August, 2020

Andrei Iancu
*Director of the United States Patent and Trademark Office*